United States Patent [19]

Burrington

[11] 4,226,446
[45] Oct. 7, 1980

[54] HOSE COUPLING

[75] Inventor: George C. Burrington, Wickliffe, Ohio

[73] Assignee: Dana Corporation, Toledo, Ohio

[21] Appl. No.: 962,071

[22] Filed: Nov. 20, 1978

[51] Int. Cl.² .................................................. F16L 33/20
[52] U.S. Cl. ........................................ 285/256; 285/259
[58] Field of Search ........................... 285/256, 259, 258

[56] References Cited

U.S. PATENT DOCUMENTS

| 2,314,890 | 3/1943 | Melsom | 285/259 X |
| 3,530,900 | 9/1970 | Kish | 285/256 X |
| 3,549,180 | 12/1970 | MacWilliam | 285/256 |
| 4,114,929 | 9/1978 | Knapp | 285/256 |

FOREIGN PATENT DOCUMENTS

| 693121 | 8/1964 | Canada | 285/256 |
| 2459690 | 6/1975 | Fed. Rep. of Germany | 285/256 |
| 1396459 | 3/1965 | France | 285/256 |

Primary Examiner—Thomas F. Callaghan
Attorney, Agent, or Firm—Pearne, Gordon, Sessions

[57] ABSTRACT

A hose coupling for permanent attachment to a hose having a reinforcing braid layer intermediate inner and outer layers of rubber or plastic has an outer sleeve which is crimped to the hose at at least three axially spaced zones. The coupling includes an insert inside the hose having axially spaced annular ridges engaging the inner surface of the hose. The outermost crimped zone overlies a ridge and the spacing between the crimped zones is greater than the spacing between the annular ridges to provide spaced inwardly progressive zones of progressively less crimping pressure.

6 Claims, 4 Drawing Figures

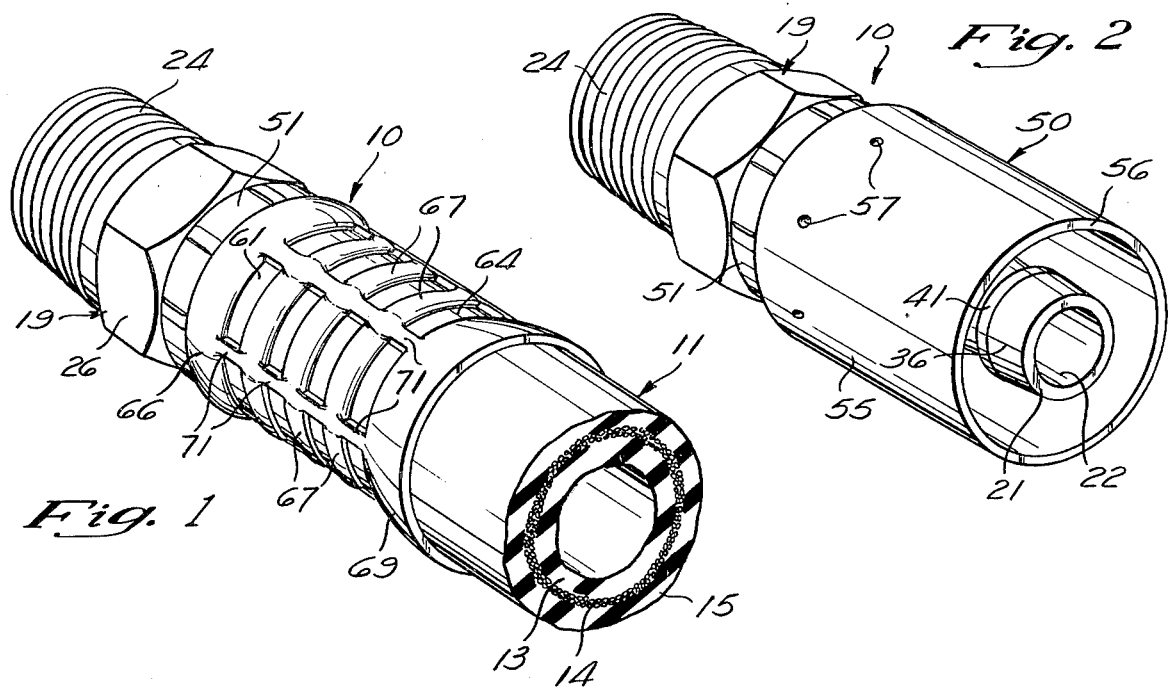
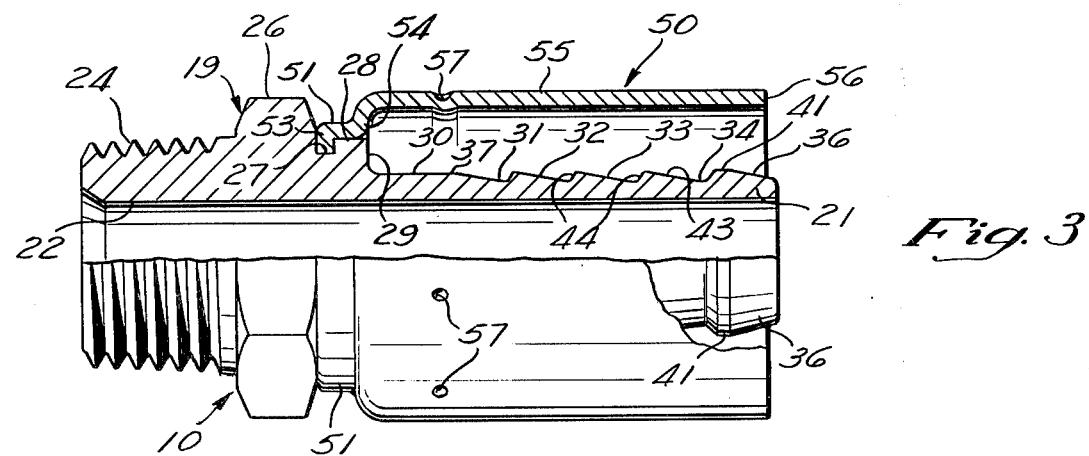
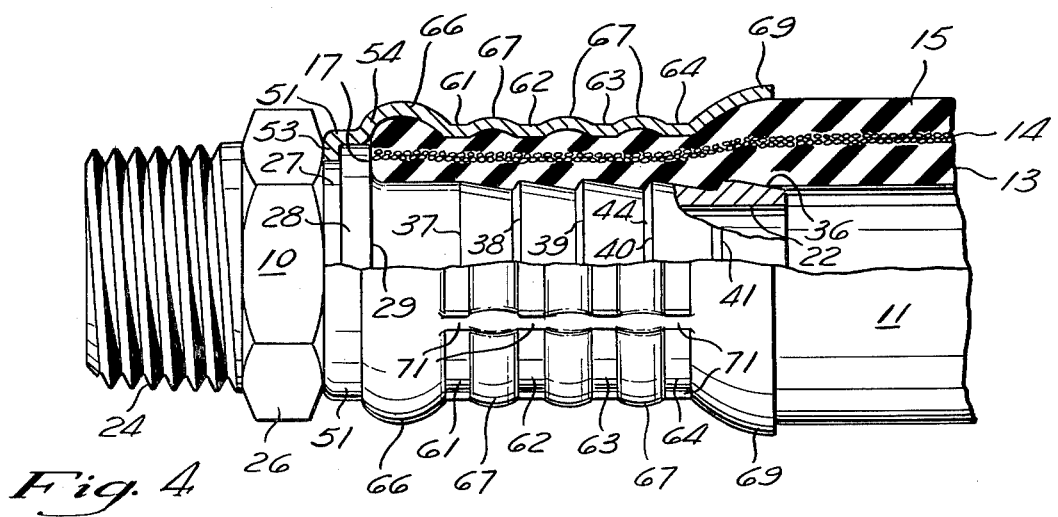

HOSE COUPLING

BACKGROUND OF THE INVENTION

This invention relates generally to a metallic hose coupling for flexible rubber and plastic hose, and more particularly, to a permanent attached hose coupling which is crimped in place on the end of the hose.

Hose ends of the permanently attached type generally comprise a unitary assembly having a tubular insert member which extends within the bore of the hose and an outer sleeve member extending over the outer surface of the hose for substantially the same length as the insert extends within the hose. Usually, the outer sleeve is a separate piece from the insert, and is permanently secured to the insert by suitable means, such as a mechanical deformation or welding, and the insert extends in the other direction beyond the sleeve to terminate in a suitable threaded fitting portion.

Two of the most important requirements of a hose fitting are, first, that it provides a seal with the hose so as not to allow the fluid within the hose to leak to the exterior of the assembly, and, second, that it grip the hose with sufficient force against the axial pressure forces exerted when the system is pressurized to prevent physical separation of the fitting and hose. In order to provide both the gripping and sealing functions of the hose end, it is well known to provide the exterior surface of the insert, that is, the surface in contact with the interior of the hose, with a plurality of annular ridges and intervening grooves of various shapes and sizes. Likewise, it is common to provide gripping means on the outer sleeve engaging the outer surface of the hose. While this may be done by machining annular ridges and grooves on the inner side of the outer sleeve, and then uniformly reducing the outer sleeve in diameter, a similar result can be obtained with lesser force required for deformation by providing what is known as a "ripple crimp" with a generally thin sleeve wall of uniform thickness. In forming such a crimp, the crimping dies are provided with a plurality of annular ridges and grooves which force the outer sleeve into a similar configuration in which the sleeve is deformed inwardly a greater amount at a number of axially spaced points, with reduced deformation intermediate these points.

Other problems that are encountered often result from variations in tolerances not only of the metal hose end, but also of the rubber or plastic tube, which generally has one or more layers of fabric or wire braid interposed between inner and outer layers of rubber or plastic, and in some cases may also be covered by a braided layer of fabric or wire. Generally, such hoses ends are attached to a hose in a machine in which a plurality of collet segments are moved radially inward to deform the metal, and the amount of such deformation is generally fixed by stops within the crimping machine. If, as a result of tolerance variations, the gripping produced by the crimping segments is insufficient, the hose end may permit leakage between the insert and the inner wall of the hose, past the end of the hose and thence outward either past the attachment of the sleeves to the insert or along the outer surface between the hose and the sleeve. Also in such case, exposure of the hose to high pressure may cause the hose end to lose its grip on the hose so that the hose end is blown off and separated from the hose. On the other hand, if the deformation produced by the crimping machine is too great, the hose may be physically damaged, particularly by crushing or weakening the braid layers in the hose, as well as by cutting of the rubber or plastic materials, and, as a result, the hose may fail by fatigue as the result of continued flexing or pressure pulsing within the hose.

SUMMARY OF THE INVENTION

The present invention provides an improved gripping and sealing arrangement for a permanently attached hose end utilizing a ripple crimp on the outer sleeve. This is done by providing a controlled compression of the hose between the sleeve and the insert at a plurality of axially spaced zones. The sleeve is provided with a ripple-type crimp in which the sleeve is reduced in diameter at at least three axially spaced crimping zones and the insert has axially spaced annular ridges and grooves that are spaced apart a distance less than the spacing between the crimped zones on the outer sleeve. Adjacent the outer end of the hose, the outermost crimp zone overlies an annular ridge on the insert to provide a maximum degree of compression of the hose at this point. Since the spacing between the crimped zones is greater than the spacing between the annular ridges on the insert, the crimped zones are aligned progressively farther away from the succeeding annular ridges. Thus, the succeeding crimp zones away from the end of the hose have progressively reduced amounts of compression of the hose with the innermost crimp having the minimum amount of compression. This minimum zone of compression occurs adjacent the end of the sleeve where the greatest amount of flexing occurs as the hose bends with respect to the hose end to minimize the amount of distortion of any braid layers and minimizing the amount of deformation of the rubber or plastic material.

Furthermore, this arrangement is particularly adapted to accommodate variations in tolerance of the hose, including wall thickness, as well as variations in the outer diameter because the space between the axially spaced crimp zones has substantially reduced compression of the hose material to allow the hose material at the crimped zones to flow axially toward the uncrimped spaces. This tends to allow a redistribution of the rubber and plastic hose material to further ensure that the progressive zones of compression with the outermost zone adjacent the end of the hose having the maximum amount of compression and the innermost zone adjacent the end of the sleeve having the minimum amount of compression, to provide sealing and gripping of the hose with minimum damage to the hose material in the zones of greatest flexing and working of the hose material.

BRIEF DESCRIPTION OF THE DRAWINGS

These and other aspects and advantages of the invention will become more readily apparent upon an understanding of the preferred embodiment of the invention as shown in the accompanying drawings, wherein:

FIG. 1 is a perspective view of a hose end according to the preferred embodiment of this invention crimped onto a flexible hose having a single reinforcing layer, with a portion of the hose broken away;

FIG. 2 is a view similar to FIG. 1, but showing the hose end without the hose before crimping;

FIG. 3 is an enlarged, elevational view of the hose end before crimping, with parts broken away; and FIG. 4 is a view similar to FIG. 3, showing the hose in place and the hose end crimped on the hose.

DESCRIPTION OF PREFERRED EMBODIMENT

Referring now to the drawings in greater detail, FIG. 1 shows a hose end 10 crimped on the end of a hose 11 in accordance with the teachings of the present invention. For purposes of clarity, the hose 11 has been shown to be of a simple, low-pressure, single layer braid type having a rubber inner layer 13 covered by a braid layer 14, and in turn having an outer layer 15 of suitable rubber for protective purposes. This type of hose is shown only by way of illustration, and it will be understood that the hose end of the present invention can be used with high pressure hoses having several layers of reinforcing braid and also with hose having a braid layer as the outermost covering rather than a layer of rubber as shown in the drawings. It will also be understood that prior to assembly, the hose is cut with a square cut end 17 to present a radially flat end surface perpendicular to the axis of the hose.

As shown in greater detail in FIGS. 2 through 4, the hose end 10 includes insert member 19 having a generally tubular insert portion 21 adapted to extend within the bore of the hose. The insert member 19 includes a tubular bore 22 extending axially throughout its length and at its upper end is shown, for purposes of illustration only, as terminating in a fitting portion 24 having a threaded end and an enlarged, hexagonal portion 26 for receiving a wrench for tightening the hose end in place with the member to which it makes a threaded connection. At this point, it should be noted that the terms "inner" and "outer" are used with reference to the hose, and not the hose end, with the result that the term "outer" is in the direction of the cut end 17, or toward the left, as shown in FIGS. 3 and 4, and the term "inner" refers to the opposite direction, or toward the right, as shown in FIGS. 3 and 4.

Inwardly of the hexagonal portion 26 is located an annular groove 27 and an enlarged annular flange 28 machined to present a radially extending abutment surface 29 to make sealing engagement with the cut end 17 of the hose. Inwardly of the abutment surface 29 is cylindrical outer surface portion 30 of the insert portion 21, followed by first, second, third, and fourth grooves, 31, 32, 33, and 34, respectively. A tapered portion 36 forms the end of the insert portion 21 and is formed with a taper to permit easy insertion of the insert portion within the bore of the hose.

As can be seen in FIGS. 3 and 4, the grooves 31 through 34 are formed with an outer side 43 having a rather shallow slope of approximately 10 degrees with the axis of the hose and an inner side 44 having a relatively steep slope of approximately 60 degrees to the axis of the hose. The outer end of each of the shallow slopes 43 is defined as a crest, so that the inner groove 31 defines a crest 37 at its junction with the outer surface 30 of the insert portion 21. Likewise, grooves 32, 33, and 34 define crests shown at 38, 39, and 40, and still an additional crest 41 is formed at the juncture between the inner groove 34 and the tapered portion 36. It should be noted that since all of the grooves 31 through 34 are identical in shape, the spacing between the crests 37 through 41 is substantially uniform.

The hose end 10 also includes a sleeve member 50 extending over the outer surface of the hose 11. At the outer end, sleeve 50 has a reduced diameter portion 51 in abutting engagement with the outer peripheral surface of flange 28 on the insert member 19. The sleeve is secured in place by an inturned flange 53 on the outer end of the reduced diameter portion 51 which engages the annular groove 27. The hose end is preassembled before it is assembled with the hose by placing the sleeve 50 in position on the insert member 19 and then radially crimping the reduced diameter portion 51 into tight gripping arrangement with the flange 28 at the same time as the inturned flange 53 on the sleeve is forced into the groove 27 so that the insert member 19 and sleeve 50 form an integral assembly prior to attachment to the hose.

As shown in FIGS. 2 and 3, before assembly of the hose, the sleeve member 50 has a radial wall portion 54 at the inner end of the reduced diameter portion 51 which joins a cylindrical portion 55 extending over the outer surface of the hose. The radial wall portion 54 is in axial alignment with abutment surface 29 and cooperates with it to form a stop or sealing face engaging the cut hose end 17. Preferably, the cylindrical portion 55 is of substantially uniform thickness, and is generally coextensive with the insert portion 21 to terminate at an end 56 in axial alignment with the tapered end 36 of the insert portion 21. At the time of assembling the sleeve 50 on the insert member 19, it is desirable to form indicia, such as dimples 57, on the outer surface of the sleeve member 50 for alignment in the crimping machine, and these dimples 57 are placed substantially in axial alignment with the outermost crest 37 on insert portion 21.

When it is desired to make up a hose assembly and attach a hose end on the hose, the hose is first cut to the proper length, making sure that the cut end 17 is square with the axis of the hose. The hose end assembly, as shown in FIG. 2, is then forced onto the end of the hose until the cut end 17 bottoms against the abutment surface 29 on the insert member 19 and the radial wall 54 of the sleeve 50. To ensure that this takes place, suitable marks may be placed on the exterior of the hose according to tables, giving the lengths of the parts for the particular type of hose end assembly and hose. Generally, the insert portion 21 is sized slightly larger than the internal bore of the hose to make an interference fit, and it may be lubricated by a suitable lubricant to aid in the assembly. However, not too much force is needed for the initial hand assembly, since the internal diameter of the sleeve member 50 in the cylindrical portion 55 is generally somewhat greater than the outer diameter of the hose because the only force really required is that necessary to force the insert portion 21 into the bore of the hose.

After the hose end 10 has been assembled on the hose 11, it is then placed in a suitable crimping machine for deforming the cylindrical sleeve member from the original configuration as shown in FIGS. 2 and 3, into the crimped configuration as shown in FIGS. 1 and 4. Such crimping may be done by any one of a number of machines which usually utilize a plurality of radially extending segment members or collet fingers, usually six or eight in number, which by suitable force are moved radially inward to crimp the hose. Suitable machines for this purpose are shown in U.S. Pat. Nos. 3,720,088; 3,742,754; 3,750,452; and 3,851,514, all of which are assigned to the assignee of this application. The collet or crimping segments will be formed to have a surface configuration engaging the sleeve 50 to produce the crimp pattern shown, and thus will consist of a plurality of axially spaced ribs, being four in number as shown in the embodiment of FIGS. 1 and 4. As the sleeve is deformed radially inward to compress the hose, the crimp produces a plurality of annular crimp zones of reduced diameter, as shown at 61, 62, 63, and 64. The outermost portion of the sleeve 50 adjacent the radial wall 54 will remain undeformed to define an annular ridge 66. Furthermore, crimping action will cause the inner end of the sleeve to flare outwardly to a diameter greater than the hose outer diameter, as shown at 69 in FIG. 4, to prevent any cutting or binding of the outer surface of the hose at this point. It should also be noted that since the crimping segments do not come completely together, there are radial gaps between the segments which may result in the formation of axially extending ribs, as shown at 71, where no crimping takes place. While this is particularly noticeable on smaller size hose ends, such ribs are much less prominent in larger sizes, and do not affect the crimping function as described in greater detail hereinafter.

With the present invention, it is quite important that the dimples 57 or some other suitable indicia be employed to ensure that the crimp zones 61 through 64 are properly positioned along the axial length of the sleeve member 50. The crimp zones 61 through 64 are uniformly spaced, with a spacing slightly greater than the spacing between the crests 37 through 41 on the insert member 19. For example, with a hose having an inner diameter of ¾-inch or 1-inch, the spacing between the crests would normally be about 0.230 inch, and the spacing between the crimp zones on the sleeves would be about 0.250 inch, so that the total spacing between the crests 37 and 40 would be about 0.060 inch less than the spacing between the crimp zones 61 and 64. As shown more particularly in FIG. 4, the crimp zone 61 is positioned in axial alignment with the crest 37, and with the spacing differential mentioned above, this ensures that the crimp zone 62 will be spaced 0.020 inch inwardly from its adjacent crest 38 and, likewise, the crimp zones 63 and 64 will be spaced from the adjacent crests 39 and 40 by amounts of 0.040 and 0.060 inch, respectively. As a result of this arrangement, the maximum radial compression of the hose will occur between the crimped zone 61 and the innermost crest 37, and since the successively inwardly spaced crimp zones 62 through 64 will overlie the shallow slopes 43 of the respective grooves, there will be a progressively decreasing amount of radial compression of the hose at these zones so that at the innermost crimp zone 64, the radial compression pressure will be the least of any of the four crimp zones. With this arrangement, the maximum gripping takes place at the outermost crimp zone, where the greatest compression occurs and provides the most positive seal. The other crimp zones, with their decreased amount of radial compression of the hose, provide progressively less deformation of the hose in these zones where more flexing and working of the hose material occur when the hose is flexed in operation. Furthermore, this arrangement permits a greater amount of crimping force to be applied at the outermost crimp zone 61 to improve the gripping and sealing force at this point, with reduced deformation at the innermost crimping zone. In addition, the formation of the annular ridge at 66 and the annular zones 67 between the crimp zones allows for cold flow and displacement of the hose material into these zones to accommodate the dimensional tolerances of both the hose end and the hose itself, and ensures an optimum crimping condition at all times without changing the operation of the crimping machine.

While the preferred embodiment of the present invention has been shown and described in particular detail, it is to be understood that various modifications and rearrangements may be made without departing from the scope of the invention as defined in the following claims.

What is claimed is:

1. A hose end assembly comprising a metal hose coupling and a flexible, nonmetallic hose having an inner bore and an outer surface, said hose coupling including an insert member having an insert portion within said hose bore and a fitting portion to connect said hose end assembly with another part, said hose end assembly including a sleeve member extending over the outer surface of said hose for an axial length substantially coextensive with the insert portion within said hose bore, said sleeve member being deformably secured to said insert member intermediate said insert portion and said fitting portion, said sleeve member and said insert portion defining a radially extending abutment in engagement with the end of said hose, said insert having at least three annular ridges of uniform axial spacing on its surface in contact with said hose bore, said annular ridges being interspaced by annular grooves, said annular grooves having a relatively shallow inward slope on their outer sides, said sleeve member having a wall portion of substantially uniform wall thickness extending over said hose and being deformed radially inward at at least three annular crimp zones of uniform axial spacing to deform the hose portion radially inward of the crimp zone, the spacing between said crimp zones being slightly greater than the spacing between said annular ridges, said outermost crimp zone and said outermost annular ridge adjacent the end of said hose being in axial alignment, each successive crimp zone being spaced progressively further inwardly from each successive annular ridge and opposite a shallow inward slope whereby said hose is compressed radially to the greatest degree at said outermost crimp zone and is compressed a progressively lesser degree at each of the successive crimp zones progressing inwardly away from the end of the hose.

2. A hose end assembly as set forth in claim 1, wherein said annular ridges are generally V-shaped and are interspaced by generally V-shaped grooves.

3. A hose end assembly as set forth in claim 2, wherein said grooves have a relatively steep slope on the inner side.

4. A hose end assembly as set forth in claim 1, wherein said crimp zones are interspaced by annular zones of larger diameter and said hose is under less radial compression in said annular zones than in any of said crimped zones.

5. A hose end assembly as set forth in claim 4, wherein said sleeve has an uncrimped portion of greater diameter than any of the annular zones between the crimped zones between the outermost crimp zone and said abutment surface adjacent the outer end of said hose.

6. A hose end assembly as set forth in claim 5, wherein said sleeve member at its inner end has an outwardly flared portion extending between the innermost crimp zone and the end, said sleeve at said end having an inside diameter greater than the outside diameter of said hose.

* * * * *